United States Patent
Kuczera et al.

(10) Patent No.: US 7,004,059 B2
(45) Date of Patent: Feb. 28, 2006

(54) HYDRAULIC MASTER CYLINDER SWITCH

(75) Inventors: Lisa Marie Kuczera, Clarkston, MI (US); Brian John Woods, Clinton Township, MI (US)

(73) Assignee: FTE automotive GmbH & Co., KG, Ebern (DE)

( * ) Notice: Subject to any disclaimer, the term of this patent is extended or adjusted under 35 U.S.C. 154(b) by 7 days.

(21) Appl. No.: 10/874,516

(22) Filed: Jun. 23, 2004

(65) Prior Publication Data

US 2005/0284288 A1    Dec. 29, 2005

(51) Int. Cl.
*F01B 25/26*    (2006.01)
(52) U.S. Cl. ............... 91/1; 91/376 R; 92/5 R; 92/165 PR
(58) Field of Classification Search .......... 91/1, 91/376 R; 92/5 R, 165 PR, 173
See application file for complete search history.

(56) References Cited

U.S. PATENT DOCUMENTS

| | | | |
|---|---|---|---|
| 2,276,028 A * | 3/1942 | Dick ............... | 200/61.89 |
| 2,278,579 A * | 4/1942 | Bluemle ............ | 200/61.89 |
| 2,716,678 A * | 8/1955 | Randol ............. | 200/61.89 |
| 3,257,522 A * | 6/1966 | Raab ............... | 200/61.89 |
| 4,617,855 A | 10/1986 | Wrobleski et al. ... | 92/5 R |
| 4,649,238 A | 3/1987 | Beck et al. ........ | 200/16 C |
| 4,664,239 A * | 5/1987 | Symes et al. ....... | 477/167 |
| 4,705,151 A | 11/1987 | Leigh-Monstevens et al. .............. | 192/111 A |
| 4,719,444 A | 1/1988 | Leigh-Monstevens et al. .............. | 340/71 |
| 4,742,193 A | 5/1988 | Kassin et al. ...... | 200/61.89 |
| 4,878,041 A | 10/1989 | Leigh-Monstevens et al. .............. | 340/479 |
| 4,911,276 A | 3/1990 | Leigh-Monstevens et al. .............. | 192/0.084 |
| 4,914,916 A | 4/1990 | Leigh-Monstevens et al. .............. | 60/534 |
| 5,343,005 A | 8/1994 | Salzmann .......... | 200/61.89 |
| 6,345,566 B1 | 2/2002 | Stevens ............ | 92/5 R |
| 6,422,125 B1 * | 7/2002 | Fulks .............. | 91/376 R |

* cited by examiner

*Primary Examiner*—Edward K. Look
*Assistant Examiner*—Igor Kershteyn
(74) *Attorney, Agent, or Firm*—Young & Basile, P.C.

(57) ABSTRACT

A switch adapted to be positioned on the pushrod of a hydraulic cylinder assembly and including a housing adapted to be positioned against an end of the hydraulic cylinder assembly and including a plurality of axially spaced electrical contacts, and a plunger mounted for axial sliding movement in the housing and adapted to be fitted over the pushrod with a driving connection between the pushrod and the plunger whereby the plunger is moved slidably forwardly in the housing in response to forward movement of the pushrod for selective coaction between the contacts to selectively generate a plurality of control signals. The driving connection between the plunger and the pushrod includes a notch opening in a rear face of the plunger and a lug formed as an eccentricity on the pushrod and fitted in the notch. A shoulder on the pushrod proximate the lug presses against a bottom surface of the notch to provide the driving connection between the pushrod and the plunger.

10 Claims, 3 Drawing Sheets

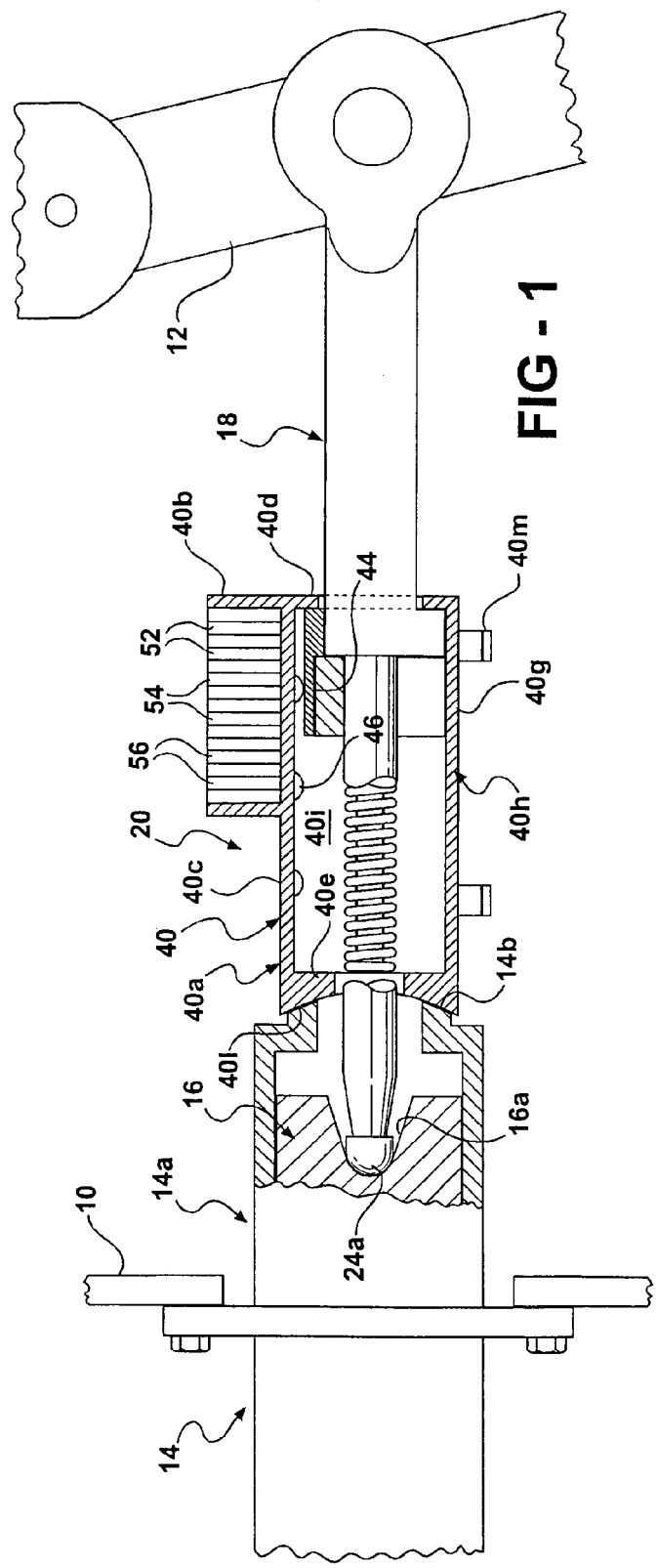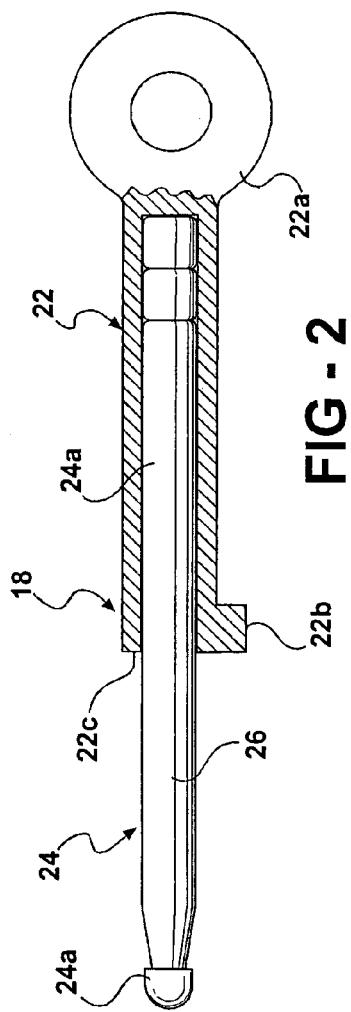

HYDRAULIC MASTER CYLINDER SWITCH

BACKGROUND OF THE INVENTION

This invention relates to an electrical switch operated by the input member of a hydraulic master cylinder assembly, such as the master cylinder of a motor vehicle clutch hydraulic control system or the master cylinder of a motor vehicle hydraulic brake system.

It has become general practice in the automobile industry to interlock the operation of the engine starter motor with other controls of the motor vehicle such that the starter motor is rendered inoperative unless the transmission is in neutral or park in motor vehicles provided with an automatic transmission, or in motor vehicles provided with a foot operated clutch and a manually operated gear shift transmission, unless the transmission is in neutral and/or the clutch pedal is fully depressed to fully release the clutch. In addition, it is convenient in a motor vehicle provided with a cruise control and a mechanical clutch to shut off the operation of the cruise control upon, for example, downshifting which in turn requires release of the clutch. However, it is necessary that the cruise control be disconnected even before the clutch is fully released to enable the driver to cut off the cruise control by a slight foot tap on the clutch pedal. It is also desirable to actuate the electronic fuel control (EFI) of the motor vehicle in response to the initial depressing movement of the clutch.

Many switch arrangements have been provided for use in association with the master cylinder assembly to accomplish the various desired switching operations as the clutch pedal is depressed. Examples of such switches are shown for example in U.S. Pat. Nos. 6,345,566; 5,343,005; 4,911,276; 4,878,041; 4,742,193; 4,719,444; and 4,649,238. The switch devices shown in these prior art patents are all of the type in which the switch mounts on the pushrod of the master cylinder assembly and in which the switch includes a plurality of axially spaced switches which can be sequentially actuated in response to the depression of the clutch to generate a sequential series of control signals with respect to cruise control (EFI) interlock, etc. Whereas these prior art switches have proven to be generally satisfactory, generating the required control signals in response to depression of the clutch, the construction of these switches is complicated by the need to preclude relative rotation between the switch and the pushrod.

SUMMARY OF THE INVENTION

This invention is directed to the provision of an improved master cylinder switch.

More specifically this invention is directed to the provision of a master cylinder switch that fits over the pushrod of the master cylinder and that includes simple and effective means to preclude rotation of the switch relative to the pushrod.

The invention relates to a switch adapted to be positioned on the pushrod of a hydraulic cylinder assembly and including a housing adapted to be positioned against the end of the hydraulic cylinder assembly and a plunger mounted for axial sliding movement in the housing, the housing and the plunger being adapted to be fitted over the pushrod with a driving connection between the pushrod and the plunger whereby the plunger is moved slidably forwardly in the housing in response to the forward movement of the pushrod for selective coaction between contact structure carried by the plunger and contact structure carried by the housing to generate a control signal.

According to the invention, the driving connection between the pushrod and the plunger includes anti-rotation structure on the plunger precluding rotation of the plunger relative to the pushrod. The use of the driving connection between the pushrod and the plunger to provide the anti-rotation capability simplifies the construction of the switch.

According to a further feature of the invention, the plunger anti-rotation structure includes an anti-rotation pocket defined in the plunger and adapted to receive an anti-rotation structure on the pushrod. This arrangement further simplifies the provision of the anti-rotation feature.

According to a further feature of the invention, the pocket comprises a notch opening in a rear face of the plunger and adapted to receive a lug formed on the pushrod and sized to fit in the notch. This specific plunger/pushrod coaction further simplifies the provision of the anti-rotation feature.

According to a further feature of the invention, the driving connection between the pushrod and the plunger comprises a shoulder on the pushrod pushingly engaging the plunger and the lug is formed at the shoulder. This arrangement further simplifies the provision of the anti-rotation feature at the driving connection between the pushrod and the plunger.

According to further feature of the invention the pushrod has a circular cross-sectional configuration and defines a central axis and the lug is constituted as an eccentricity formed on the pushrod proximate the shoulder. In the preferred embodiment, the plunger and the housing define downwardly opening grooves to facilitate fitting of the housing and plunger over the pushrod and the notch in the plunger is defined in surrounding relation to the groove in the plunger.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a cross-sectional view of a master cylinder assembly including a master cylinder switch according to the invention;

FIG. 2 is a cross-sectional view of a pushrod employed in the master cylinder assembly of FIG. 1;

DESCRIPTION OF THE PREFERRED EMBODIMENT

Figure 3:
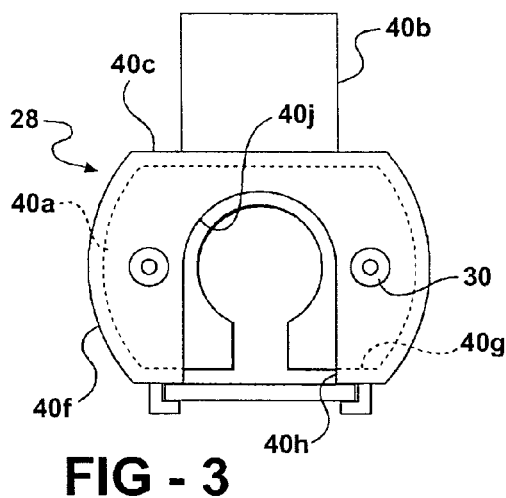
FIGS. 3 and 4 are end views of a switch employed in the master cylinder assembly of FIG. 1.
Figure 5:
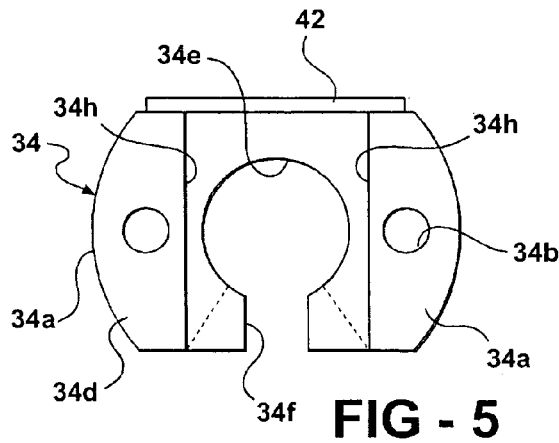
FIGS. 5, 6, and 7 are end and bottom views of a plunger employed in the switch.
Figure 4:
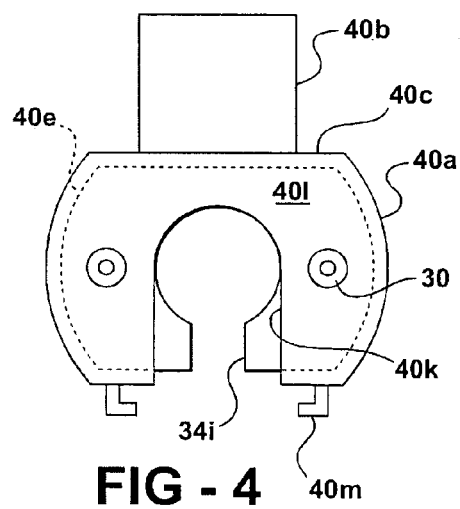
Figure 6:
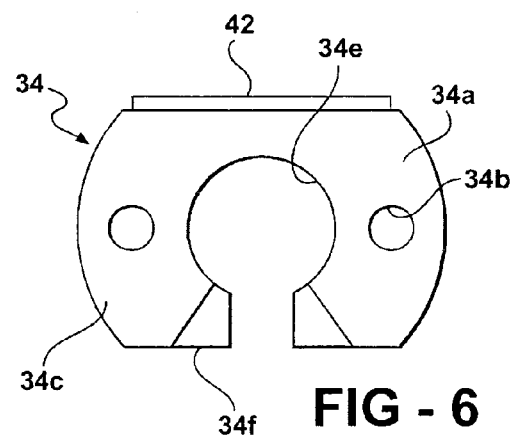
Figure 7:
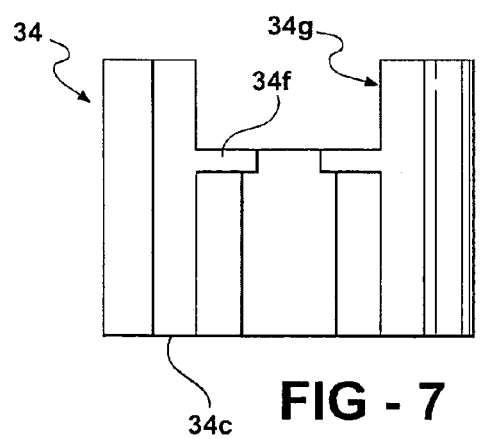
Figure 8:
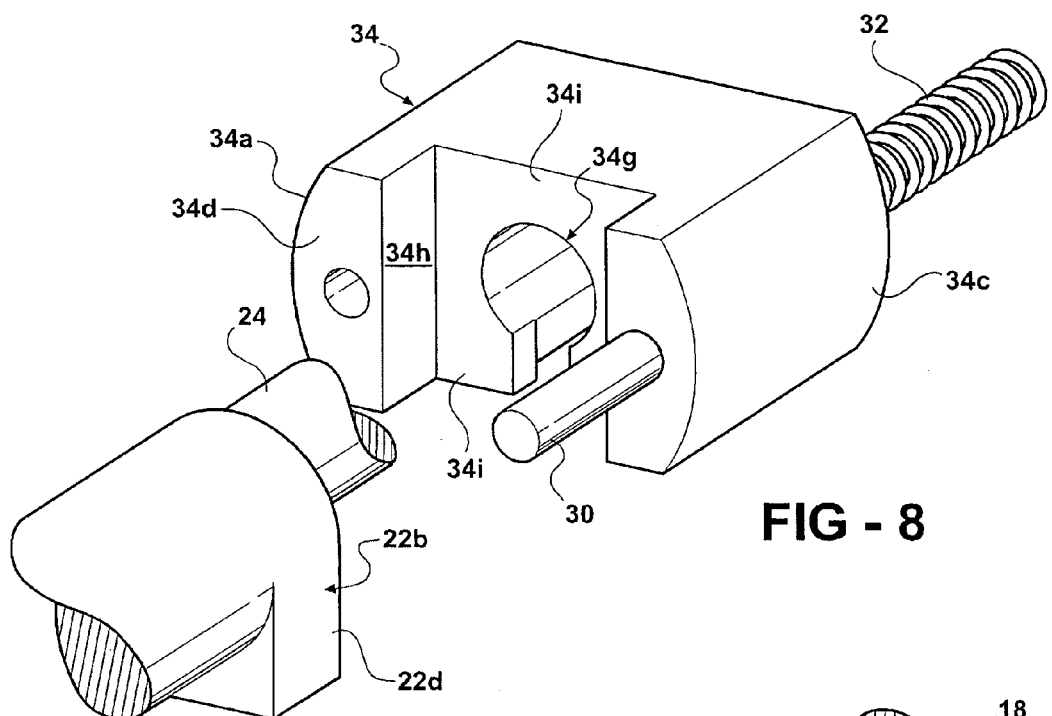
FIG. 8 is a fragmentary, exploded, perspective view showing the interaction of the master cylinder pushrod and the plunger.
Figure 9:
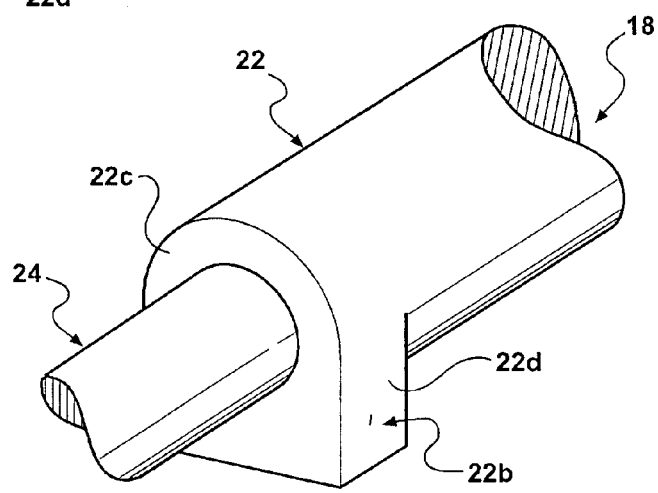
FIG. 9 is a fragmentary perspective view of the pushrod.
Figure 10:
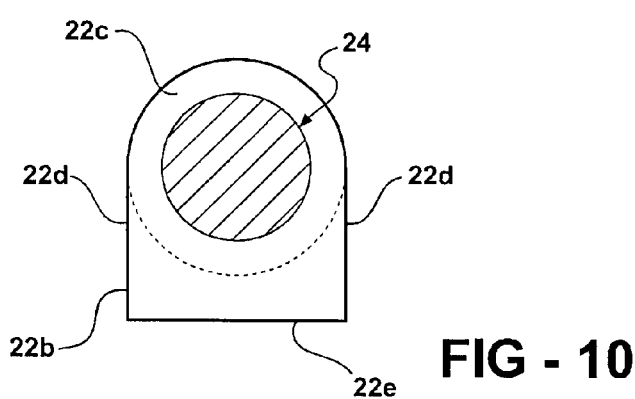
FIG. 10 is a cross sectional view of the pushrod.

The invention master cylinder switch assembly is seen in FIG. 1 in association with a motor vehicle of the type including an engine compartment partition 10, a control panel 12 (such as a clutch pedal or a brake pedal), a master cylinder 16 secured in known manner to the front face of the partition 10 and projecting at its rearward portion 14a through and rearwardly of the partition, a piston 16 mounted for reciprocal movement in the cylinder 14; and a pushrod 18 pivotally secured at its rear end to clutch pedal 12 and pivotally associated at its forward end with piston 16, so that, in known manner, as pedal 12 is depressed the pushrod 20 moves forwardly into the rear end of the master cylinder to move the piston 16 forwardly within the cylinder and transmit pressurized hydraulic fluid to a suitable slave cylinder to actuate, for example, a clutch or brake of the motor vehicle.

The invention switch assembly 20 is mounted on pushrod 18 rearwardly of the master cylinder and within the passenger compartment.

Pushrod 18 has a circular cross-sectional configuration and is formed as a composite structure including a rearward member 22 formed of a plastics material and a reduced diameter forward member 24 formed of a ferrous material. Member 22 may be formed for example of a glass reinforced nylon material and is preferably molded in place over the rearward portion 24a of forward member 24. Member 22 includes an eye portion 22a at its rearward end for pivotal engagement with the clutch pedal and a forward lug portion 22b formed at the shoulder 22c at the interface of the forward member 24 and the rearward member 22 and comprising a downwardly extending eccentricity with respect to the central axis 26 of the pushrod.

Lug 22b will be seen to have a generally rectangular configuration bounded by parallel sides 22d and a bottom edge 22e.

Forward member 24 defines a forward ball end 24a pivotally received in a socket 16a in the rear end of piston 16 in known manner.

Switch assembly 20 includes a housing 28, guide rods 30, coil springs 32, a plunger 34, cruise control contacts 36, EFI contacts 38, and interlock contacts 40.

Housing 20 is formed of a phenolic material, has a U or horseshoe configuration, and includes a main body portion 40a and a socket portion 40b upstanding from the upper face of the main body portion 40a.

Main body portion 40a includes a flat upper wall 40c, a rearward end wall 40d, a forward end wall 40e, arcuate side walls 40f, and laterally spaced bottom wall portions 40g separated by a central axial slot 40h. Walls 40c, 40d, 40e, 40f and 40g coact to define an axially extending housing hollow 40i. Downwardly opening grooves 40j and 40k are provided, respectively, in end walls 40d and 40e. Grooves 40j and 40k have a width generally corresponding to the width of slot 40h and are sized to loosely pass the reduced diameter portion 24 of the pushrod 18. A semiannular concave spherical bearing surface 40l is provided on the outboard face of end wall 40e of the housing for coaction with a spherical convex bearing surface 14b defined on the rear end of the master cylinder. Surface 40l has a U-configuration and surrounds the slot 40k in end wall 40e.

Guide rails 30 extend fixedly from end wall 40d to end wall 40e of the housing in parallel, laterally spaced relation. Coil springs 32 are respectively positioned around guide rods 30.

Plunger 34 has a U or horseshoe configuration generally matching the interior cross-sectional configuration of housing main body 40a and includes a contact strip 42 of electrically conductive material secured to its upper face. Each leg 34a of the plunger includes a bore 34b slidably receiving the respective guide rail 30 with a respective coil spring 32 positioned on the guide rail between the rear face 34c of the plunger and the inboard face of housing end wall 40e. Springs 32 act to normally press the rear face 34d of the plunger against the inboard face of housing end wall 40d.

Contact pairs 44, 46 and 48 are secured to the underface of the upper wall 40c of the housing within the hollow 40i of the housing and in proximity to the path of sliding movement of plunger 34 within the housing. Contact pairs 44, 46 and 48 are formed of an electrically conductive material and are respectively connected in known manner to three corresponding sets of contact fingers or prongs 52, 54 and 56 provided in upstanding serial fashion within housing socket portion 40b.

Plunger 34 includes a downwardly opening groove 34e sized to fit over pushrod portion 24. Fin portions 34f at the lower end of the channel proximate the rear face of the groove are sized to provide an interference fit with the pushrod portion 24 so that as the housing and encased plunger are pushed downwardly over the pushrod portion 24 the pushrod portion 24 moves into the groove 34e with a snap action.

A pocket or notch 34g is provided in the rear face 34d of the plunger. Notch 34g is sized to snugly receive the lug 22b of the pushrod with the sidewalls 22d of the lug fitting snugly and confrontingly against the sidewalls 34h of the notch 34g and the annular shoulder 22c of the pushrod pressing against the front face 34i of the notch 34g.

The lug 22b and notch 34g will be seen to coact to define a driving connection between the pushrod and the plunger, whereby the plunger is moved slidably forwardly in the housing in response to the forward movement of the pushrod for selected coaction between contact strip 42 and contact pairs 44, 46 and 48, and further serves to provide an anti-rotation structure precluding relative rotation of the plunger and pushrod.

To install the switch on the pushrod, the switch is positioned over the reduced diameter portion 24 of the pushrod and moved downwardly to snapingly mount the housing and plunger on the reduced diameter pushrod portion with the lug 22b fitting snugly into notch 34g, whereafter the switch may be adjusted forwardly on the pushrod to position the spherical housing surface 40l against the spherical cylinder surface 14b. If desired, a bottom panel (not shown) may be positioned beneath the housing in covering relation to slot 40h utilizing hook members 40m downstanding from the bottom wall of the housing.

In operation, push rod shoulder 22c presses against notch face 34i whereby the plunger is moved forwardly within the housing in response to forward movement of the pushrod in response to pivotal movement of the clutch pedal 12 with lug 22b and notch 34g coacting to preclude rotation of the switch relative to the pushrod. As the plunger moves forwardly, it selectively closes the respective contact pairs 44, 46, and 48 to generate the respective control signals associated with these contact pairs and the control signals are transmitted via terminals 52, 54 and 56 to the appropriate vehicle control circuitry. The interaction of swivel surface 40l and swivel surface 14b will be seen to allow the housing to move swively in response to the arcuate movement of the eye structure 22a in response to pivotal movement of the pedal 12.

The invention will be seen to provide an effective, reliable and inexpensive arrangement for providing the driving connection between the pushrod and the plunger while simultaneously providing an anti-rotation structure to preclude rotation of the plunger relative to the pushrod.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A switch adapted to be positioned on a pushrod of a hydraulic cylinder assembly and including a housing adapted to be positioned proximate an end of the hydraulic cylinder assembly and a plunger mounted for axial sliding movement in the housing, the housing and plunger being adapted to be fitted over the pushrod with a driving connection between the pushrod and the plunger whereby the plunger is moved slidably forwardly in the housing in response to forward movement of the pushrod for selective coaction between contact structure carried by the plunger and contact structure carried by the housing to generate a control signal, characterized in that:

the driving connection between the pushrod and the plunger includes anti-rotation structure on the plunger precluding rotation of the plunger relative to the pushrod.

2. A switch according to claim 1 wherein the plunger anti-rotation structure includes an anti-rotation pocket defined in the plunger and adapted to receive an anti-rotation structure on the pushrod.

3. A switch according to claim 2 wherein the pocket comprises a notch opening in a rear face of the plunger and adapted to receive a lug formed on the pushrod and sized to fit in the notch.

4. A switch according to claim 3 wherein:

the plunger and the housing define downwardly opening channels to facilitate fitting of the housing and plunger over the pushrod; and the notch is defined in surrounding relation to the channel in the plunger.

5. A hydraulic master cylinder assembly including a master cylinder, a piston mounted in the master cylinder, a pushrod projecting at its forward end into the rear end of the master cylinder for connection to the piston, and a switch assembly positioned on the pushrod and including a hollow switch housing defining switch means and a plunger assembly mounted on and driven by the pushrod for sliding movement in the housing in response to forward movement of the pushrod to coact with the switch means to generate a control signal, characterized in that:

the driving connection between the pushrod and the plunger includes anti-rotation structure precluding rotation of the plunger relative to the pushrod.

6. A master cylinder assembly according to claim 5 wherein the anti-rotation structure includes an anti-rotation pocket defined in the plunger and an anti-rotation structure on the pushrod received in the pocket.

7. A hydraulic master cylinder assembly according to claim 6 wherein the pocket comprises a notch opening in a rear face of the plunger and the anti-rotation structure on the plunger comprises a lug sized to fit in the notch.

8. A hydraulic master cylinder assembly according to claim 7 wherein:

the driving connection comprises a shoulder on the pushrod pushingly engaging the plunger; and the lug is formed at the shoulder.

9. A hydraulic master assembly according to claim 8 wherein:

the pushrod has a circular cross-sectional configuration and defines a central axis; and the lug is constituted as an eccentricity formed on the pushrod proximate the shoulder.

10. A hydraulic master cylinder assembly according to claim 7 wherein:

the plunger and the housing define downwardly opening grooves to accommodate positioning of the switch assembly on the pushrod; and the notch is formed in the rear face of the plunger in surrounding relation to the downwardly opening groove in the plunger.

* * * * *